(12) United States Patent
Kordass et al.

(10) Patent No.: US 9,027,394 B2
(45) Date of Patent: May 12, 2015

(54) VARIABLE INJECTOR MOUNTING

(75) Inventors: Sven Kordass, Köngen (DE); Reinhard Hoss, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 13/882,969

(22) PCT Filed: Sep. 29, 2011

(86) PCT No.: PCT/EP2011/066992
§ 371 (c)(1),
(2), (4) Date: Jul. 23, 2013

(87) PCT Pub. No.: WO2012/059278
PCT Pub. Date: May 10, 2012

(65) Prior Publication Data
US 2013/0291631 A1    Nov. 7, 2013

(30) Foreign Application Priority Data

Nov. 3, 2010  (DE) .......................... 10 2010 043 305
May 9, 2011  (DE) .......................... 10 2011 075 485

(51) Int. Cl.
*G01M 15/02*   (2006.01)
*F02M 65/00*   (2006.01)

(52) U.S. Cl.
CPC .............. *G01M 15/02* (2013.01); *F02M 65/00* (2013.01); *F02M 65/001* (2013.01)

(58) Field of Classification Search
USPC ....................................... 73/114.45
See application file for complete search history.

(56) References Cited

U.S. PATENT DOCUMENTS

| | | | |
|---|---|---|---|
| 2,857,759 A * | 10/1958 | Kiene ........................ | 73/114.45 |
| 3,117,444 A | 1/1964 | Isaac | |
| 5,000,043 A | 3/1991 | Bunch et al. | |
| 6,322,063 B1 * | 11/2001 | Steinhart ....................... | 269/152 |
| 6,820,468 B2 * | 11/2004 | Powers et al. .................. | 73/49.7 |
| 7,594,631 B1 * | 9/2009 | Carnevali ................... | 248/219.4 |
| 7,878,052 B2 * | 2/2011 | Danby et al. .............. | 73/114.49 |
| 2002/0136637 A1 * | 9/2002 | Powers et al. ............. | 416/219 R |
| 2008/0115344 A1 * | 5/2008 | Carnevali .................. | 29/525.15 |
| 2010/0024537 A1 | 2/2010 | Danby et al. | |
| 2013/0206937 A1 * | 8/2013 | Kordass et al. ............ | 248/176.3 |

FOREIGN PATENT DOCUMENTS

| | | |
|---|---|---|
| CN | 200982261 | 11/2007 |
| CN | 101556202 | 10/2009 |

OTHER PUBLICATIONS

International Search Report for PCT/EP2011/066992, dated Jan. 2, 2012.

* cited by examiner

*Primary Examiner* — Freddie Kirkland, III
(74) *Attorney, Agent, or Firm* — Kenyon & Kenyon LLP

(57) ABSTRACT

An injector test stand for fuel injectors includes: a holder for fixing a fuel injector an injection chamber which is positionable relative to the fuel injector, and a variable injector mounting which includes a rotatable insert having at least one adjustable clamping jaw is accommodated in the holder.

11 Claims, 19 Drawing Sheets

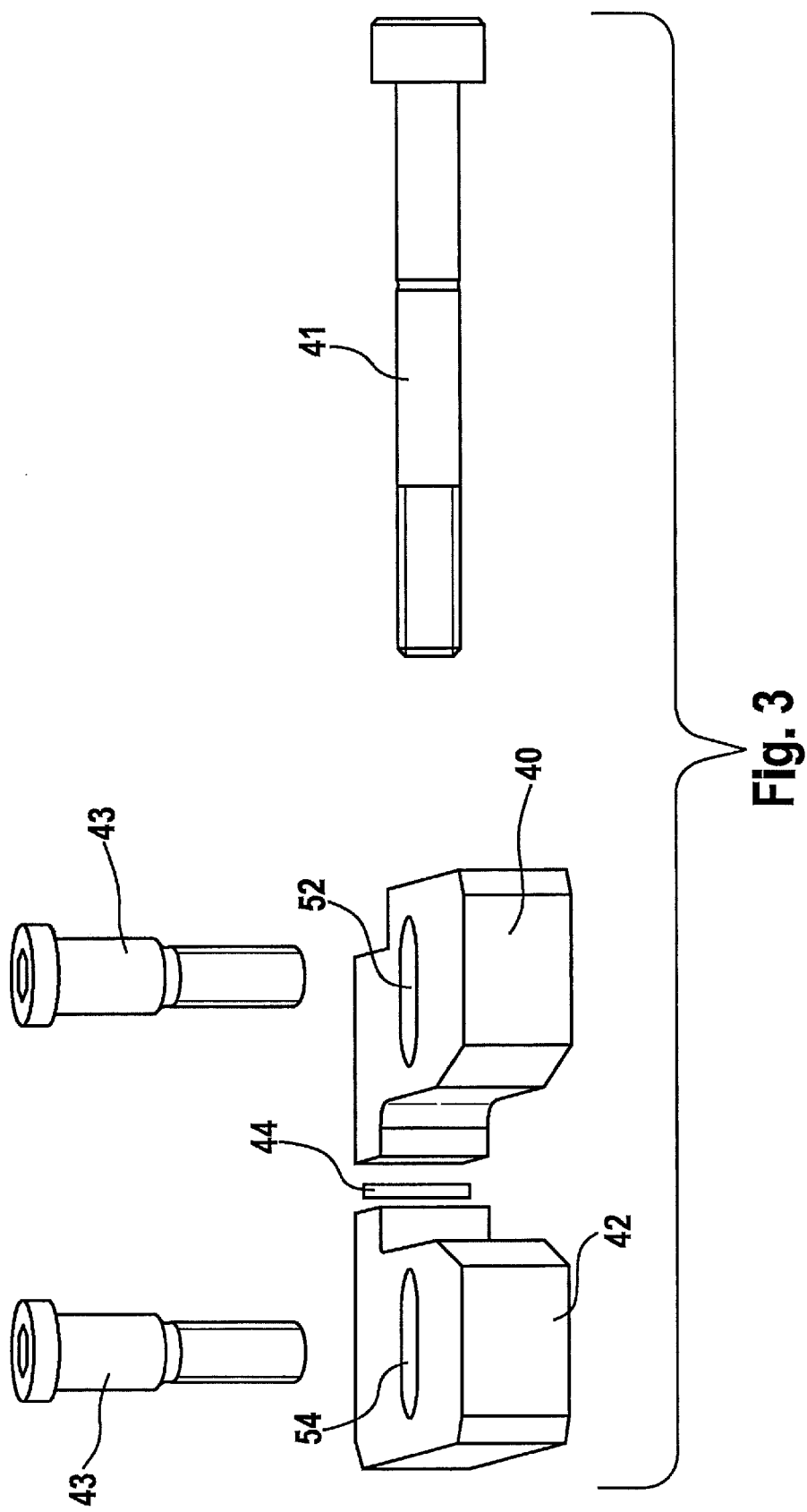

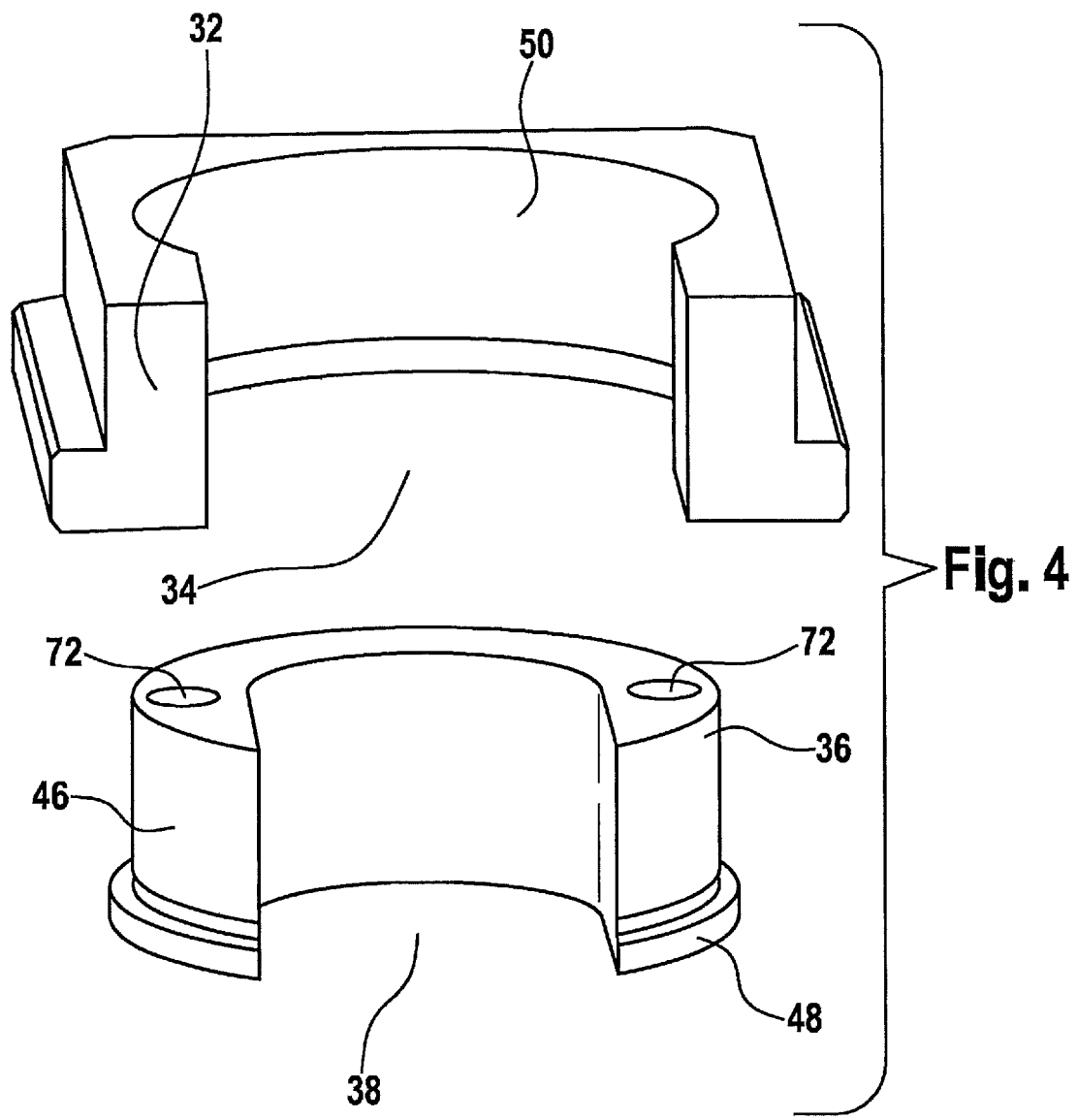

Fig. 5.1
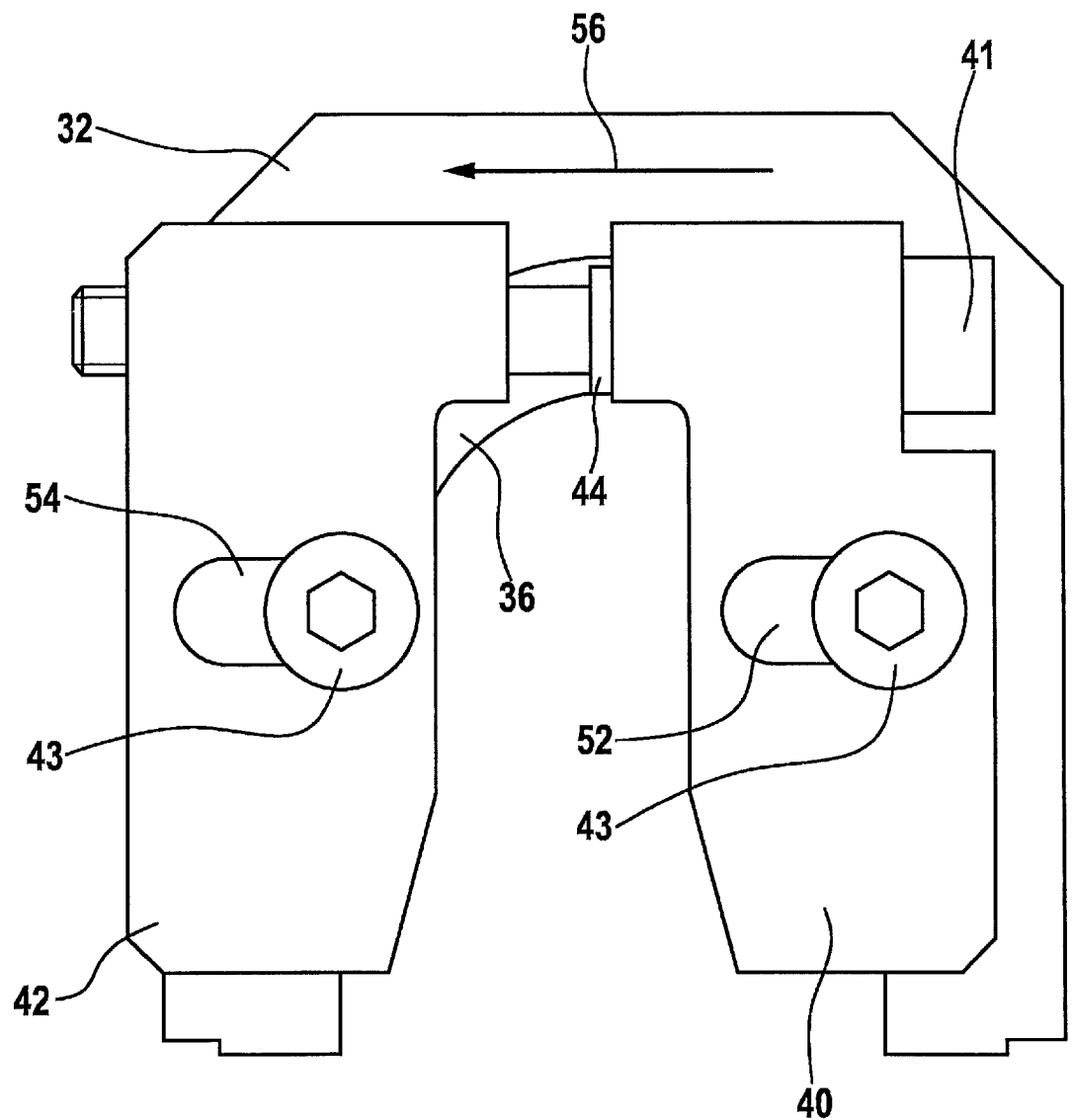

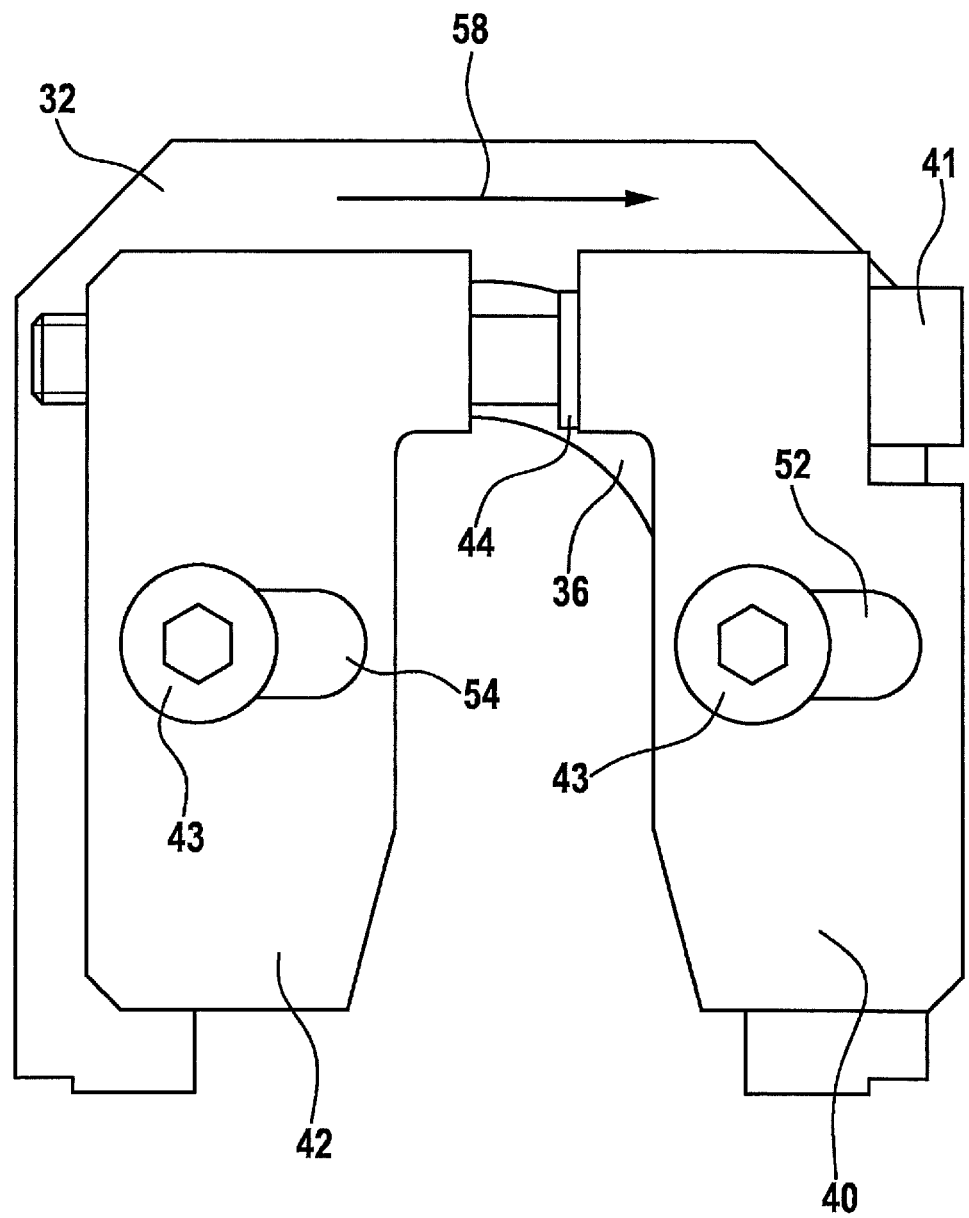
Fig. 5.2

Fig. 6.1
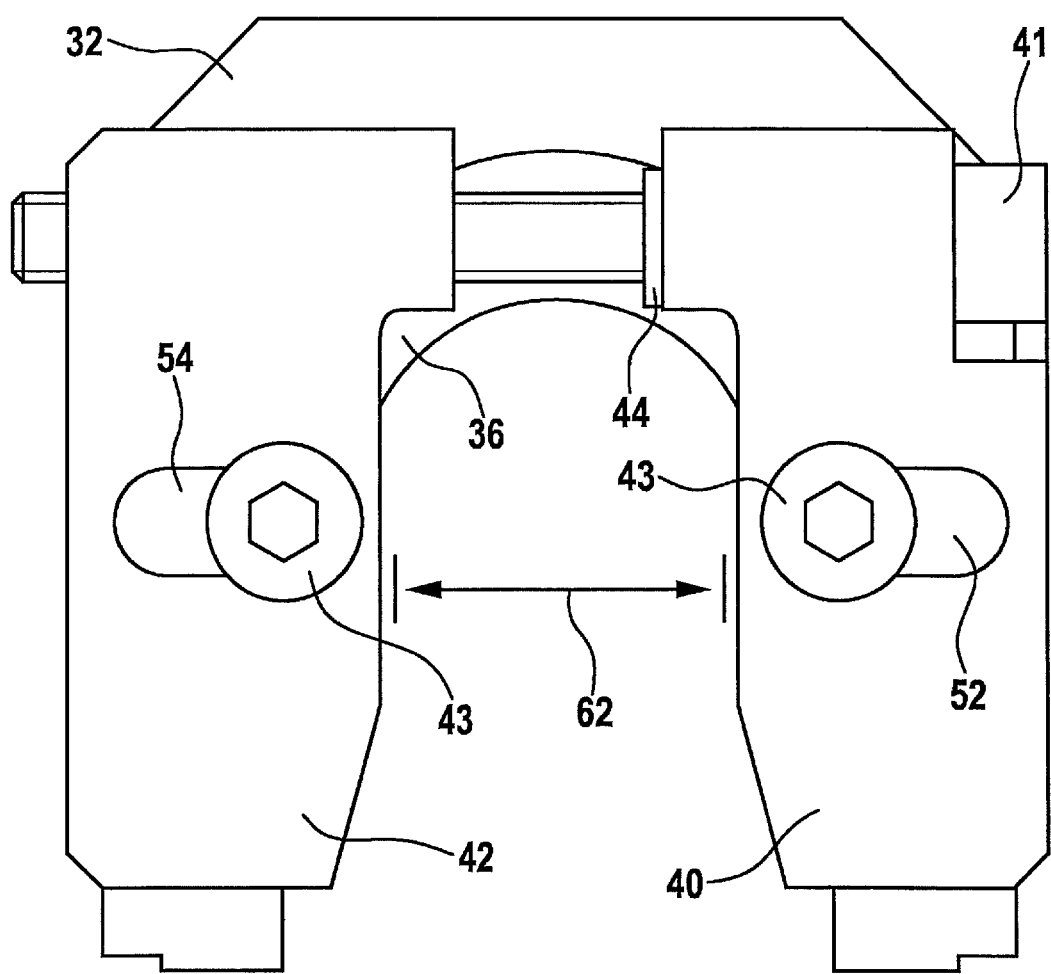

Fig. 6.2
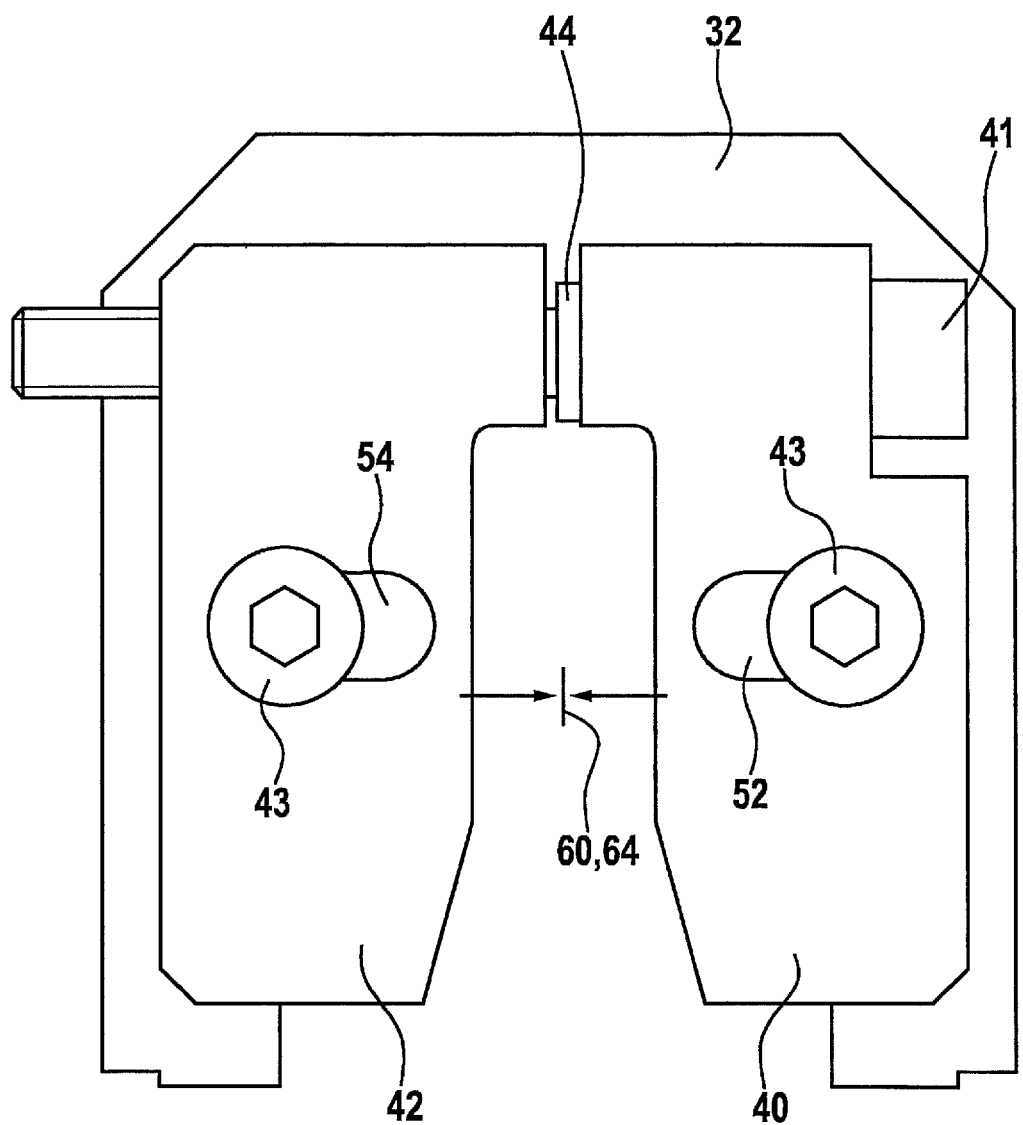

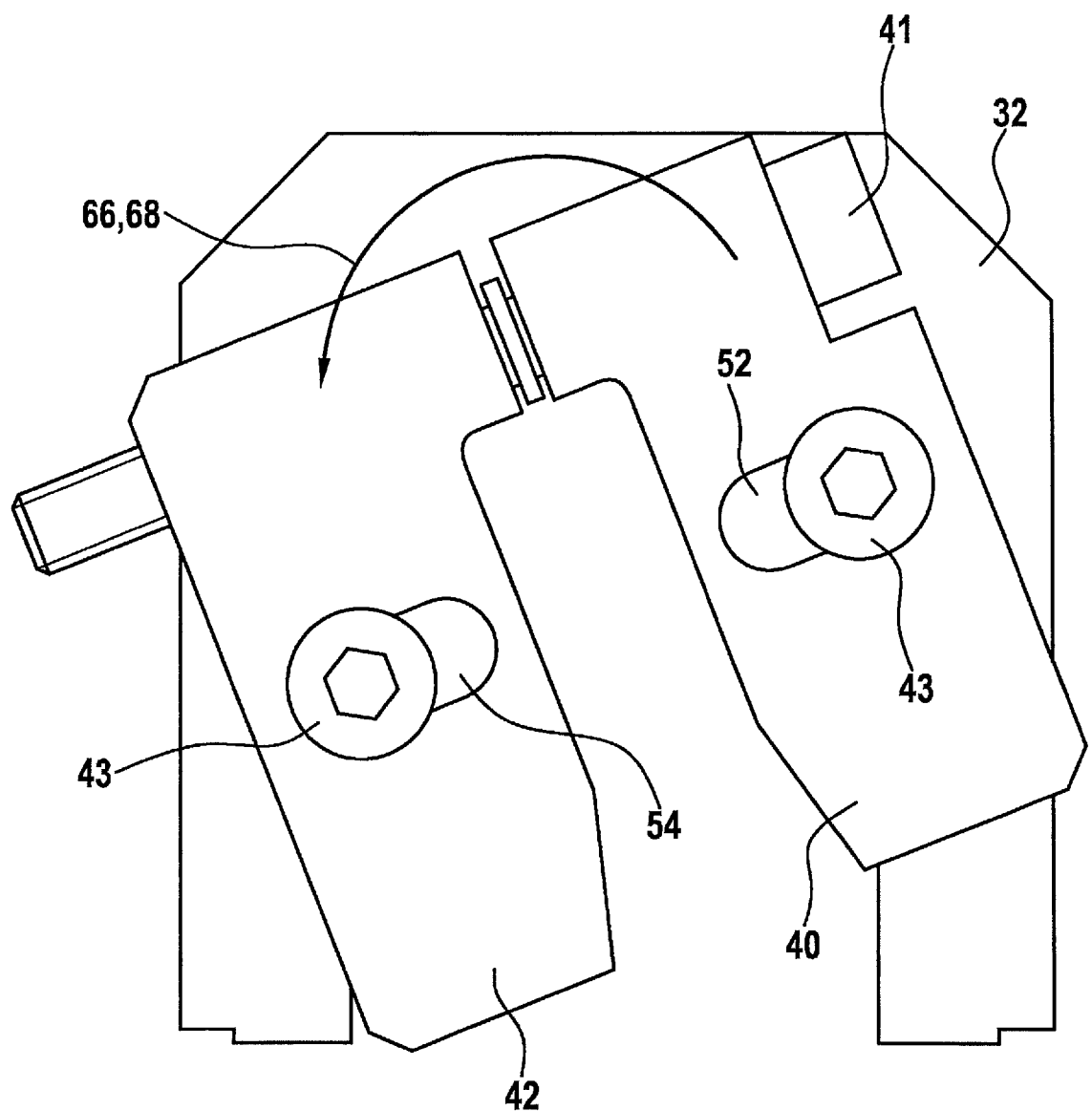
Fig. 7.1

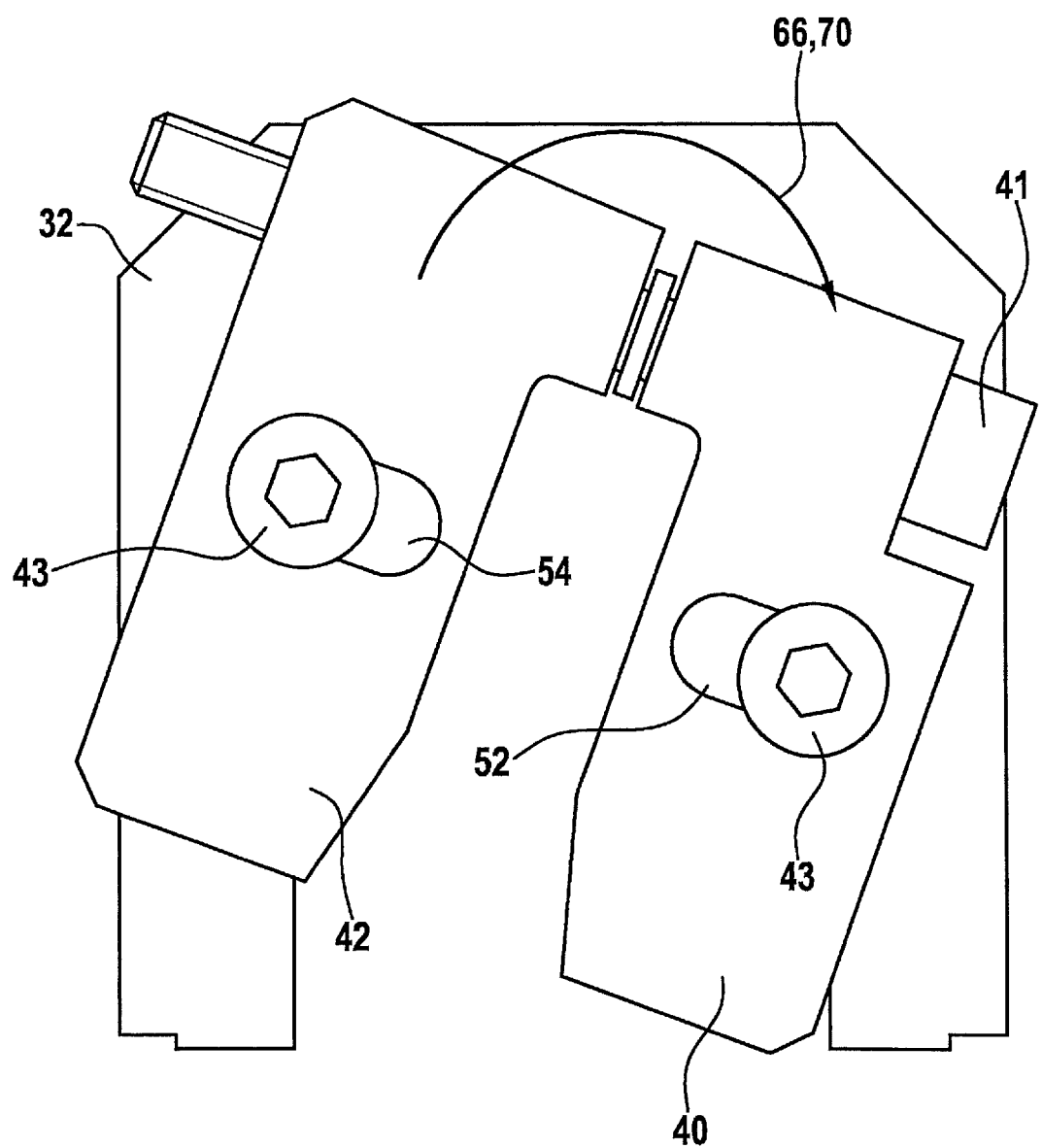
Fig. 7.2

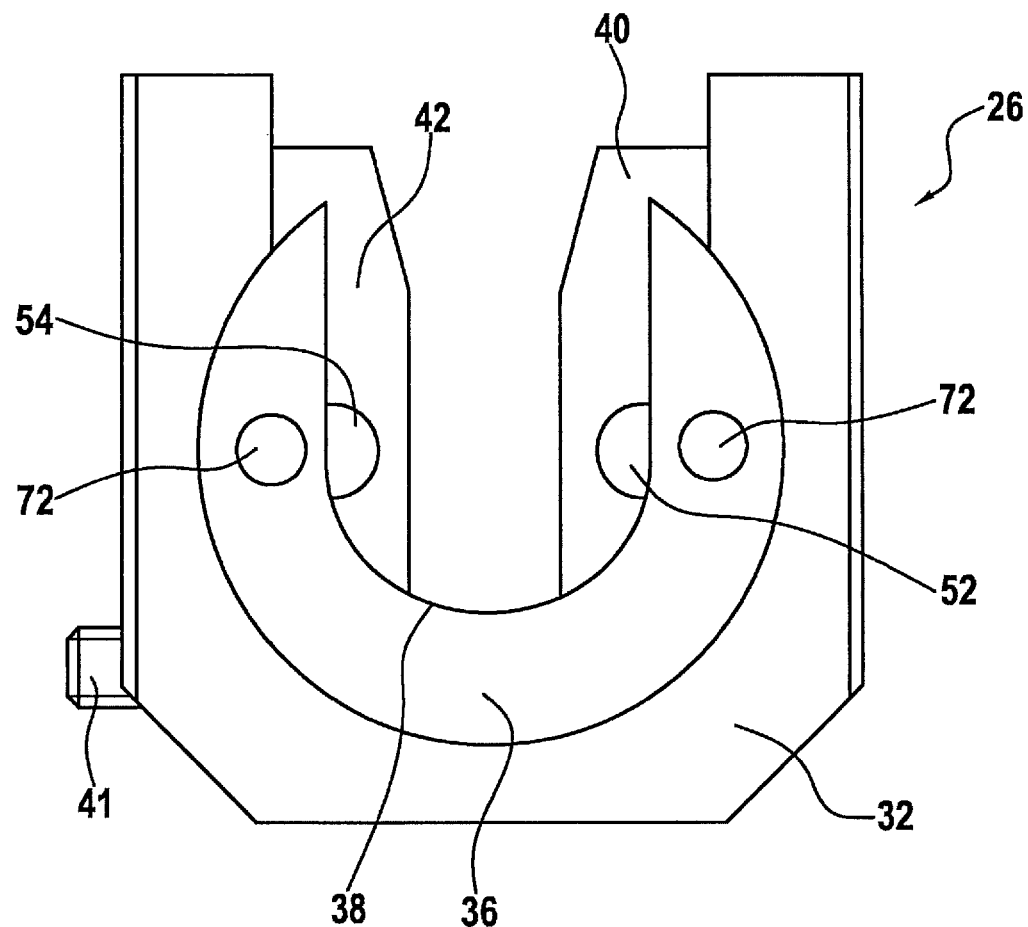
Fig. 8.1

Fig. 8.2
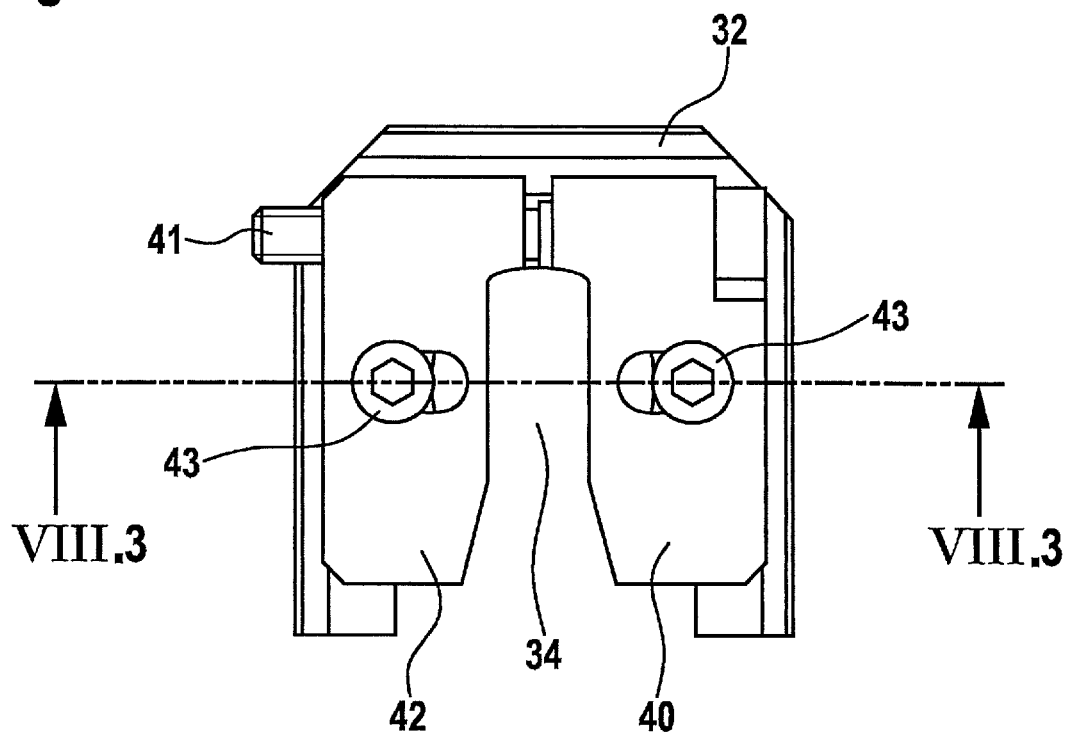
Fig. 8.3
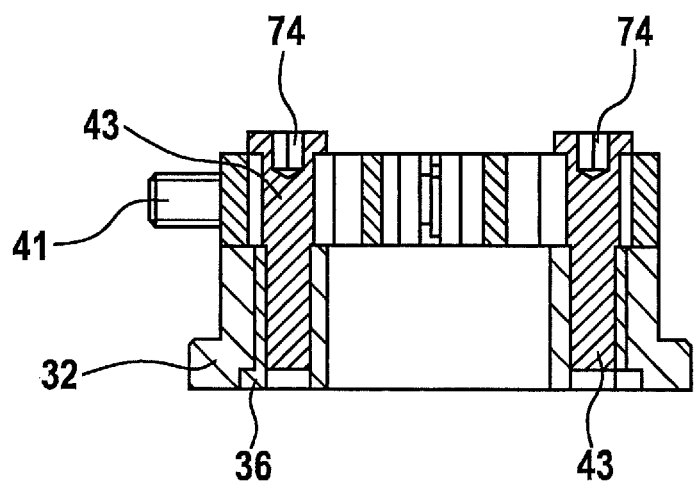

Fig. 9
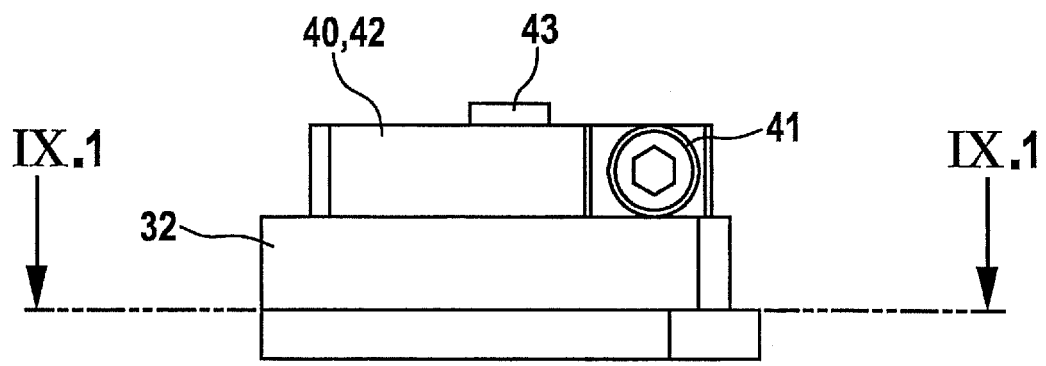
Fig. 9.1
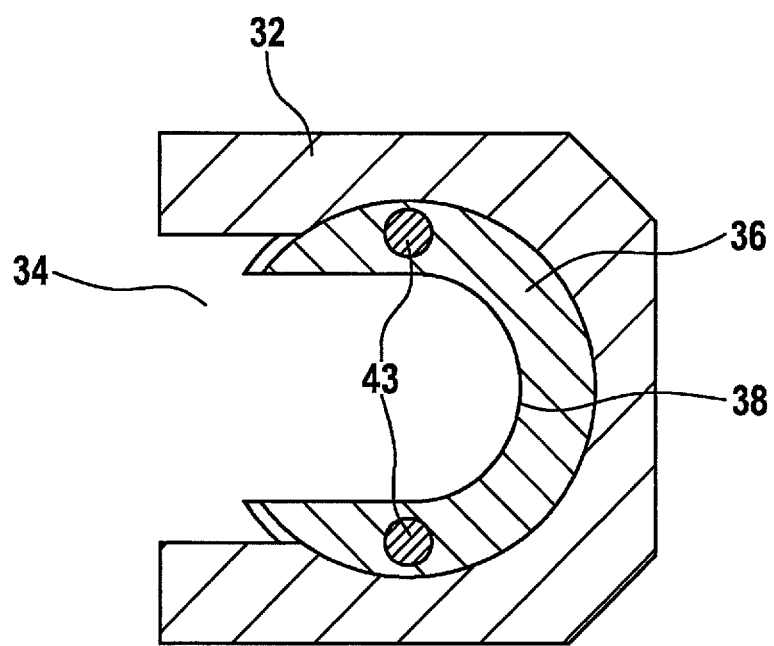

Fig. 11.1
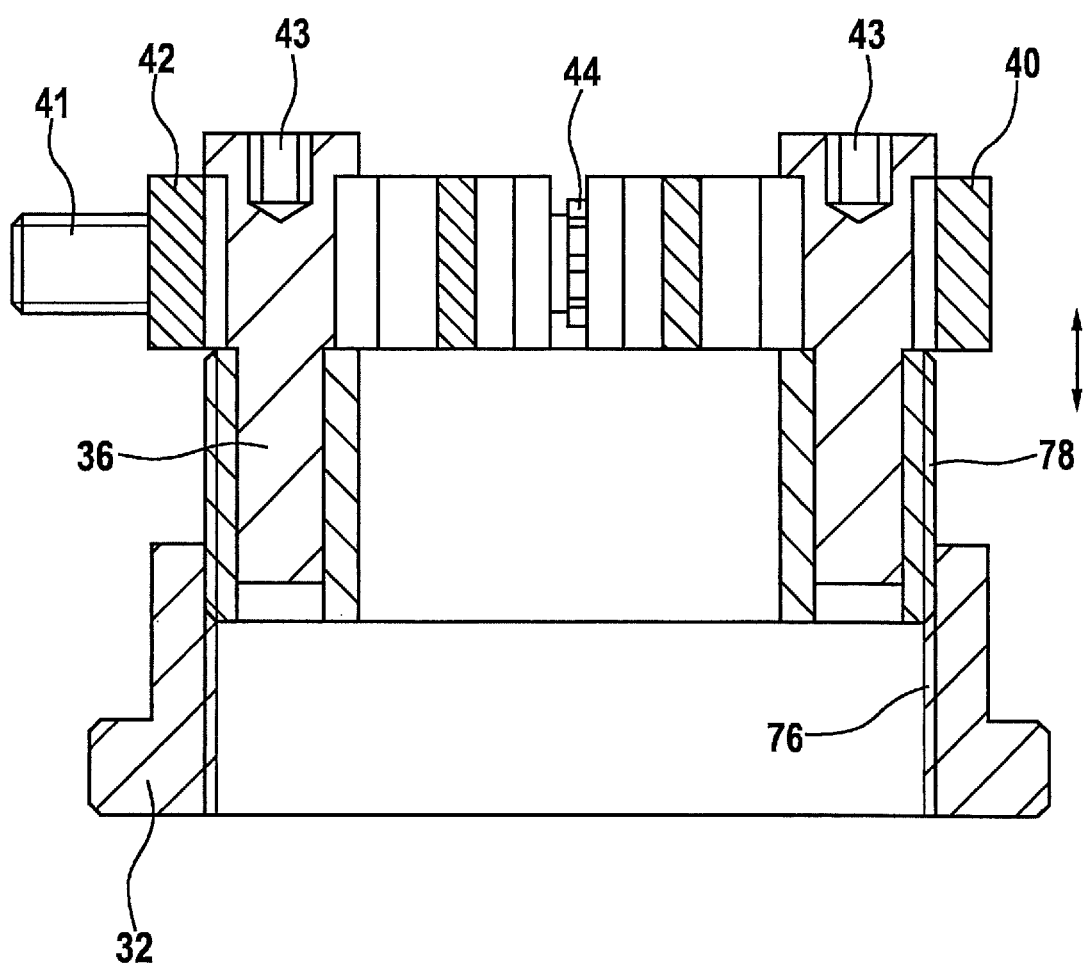

Fig. 11.2
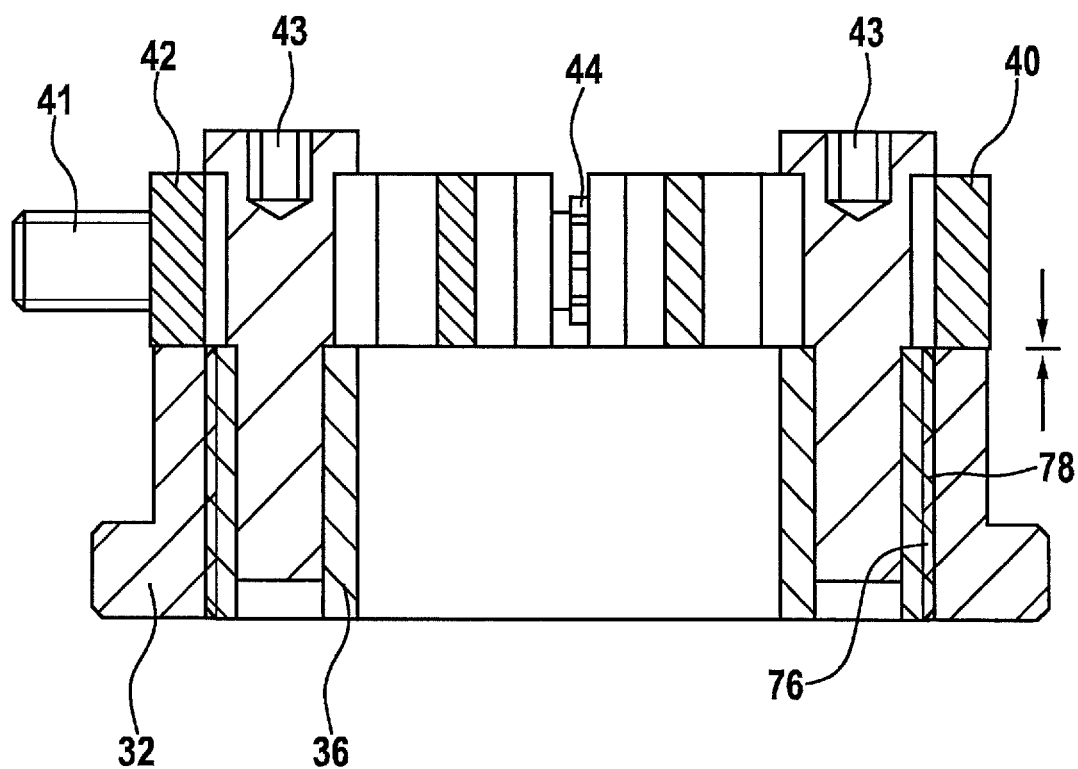

Fig. 13.1
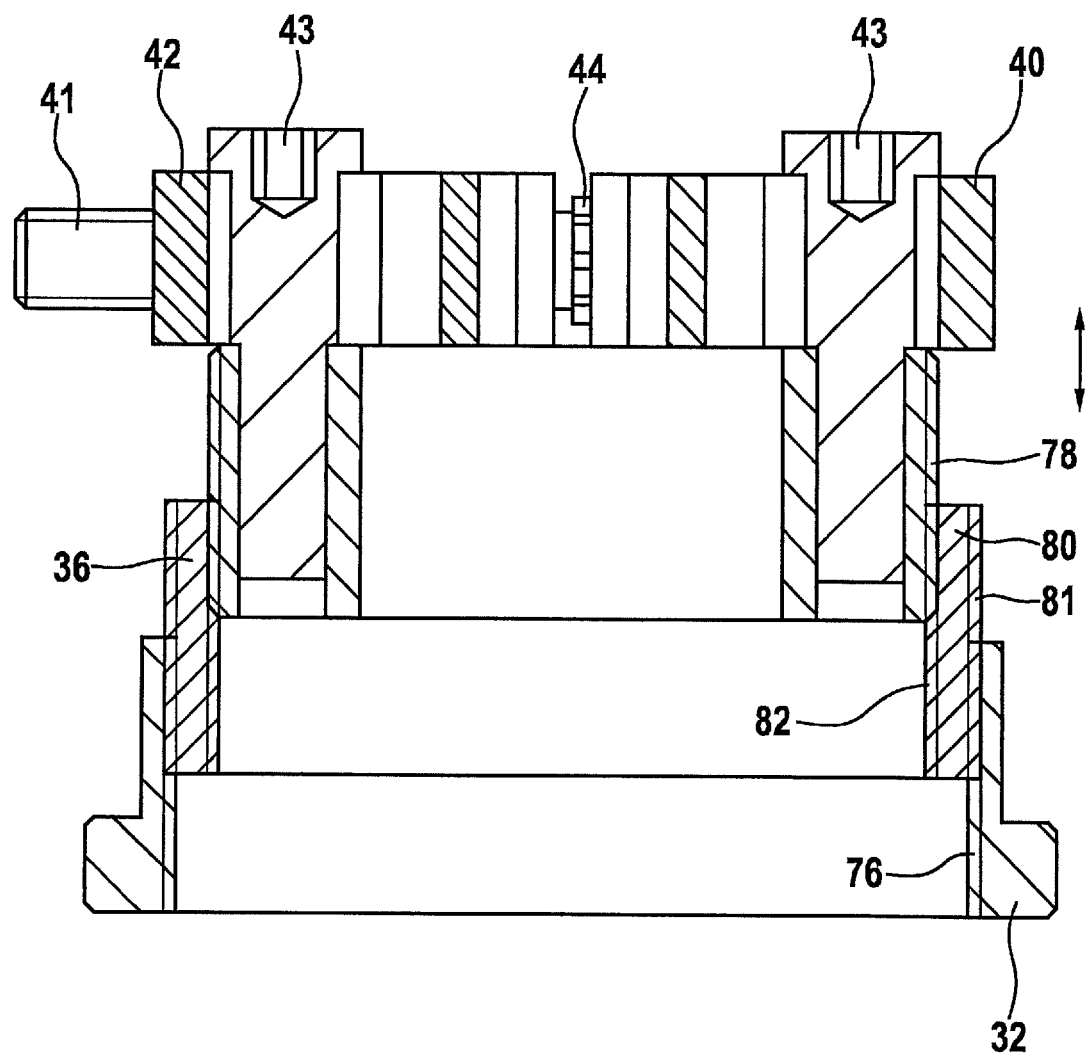

Fig. 13.2
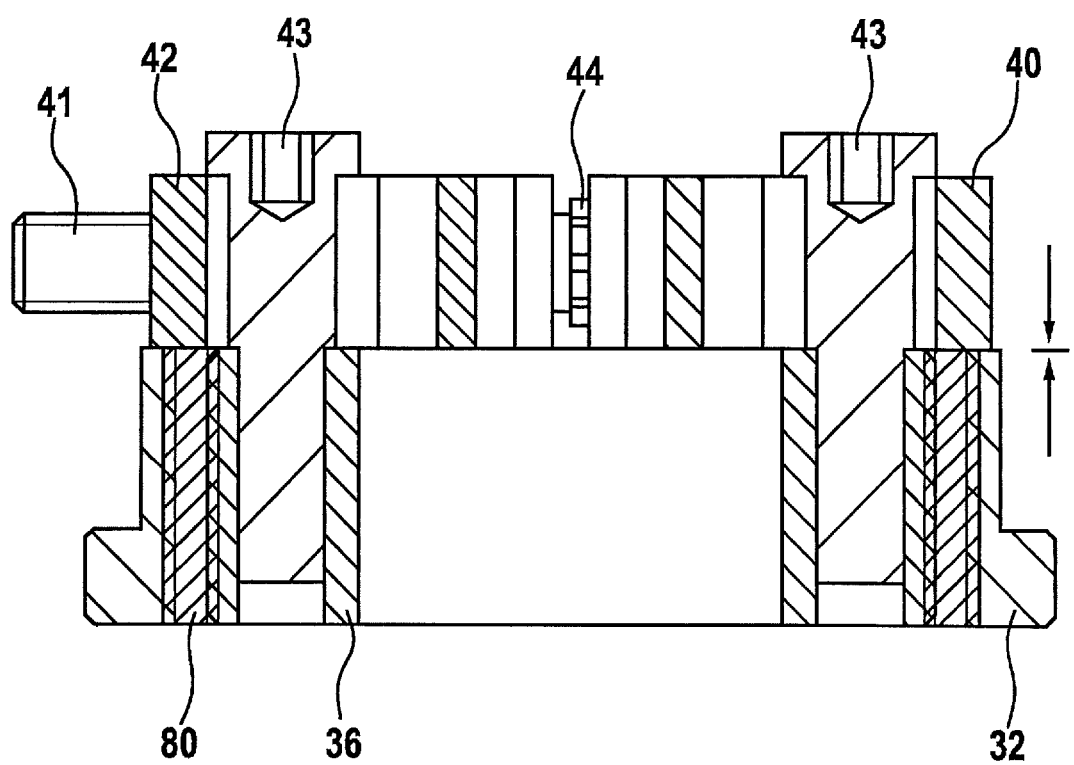

VARIABLE INJECTOR MOUNTING

BACKGROUND OF THE INVENTION

1. Field of the Invention

The present invention relates to an injector test stand for fuel injectors.

2. Description of the Related Art

For the clamping of fuel injectors for high-pressure accumulator injection systems, for example the common rail injection system, in injector test stands, several options for chucking the fuel injectors to be tested in the injector test stands are available, which are dependent on the sealing of the fuel injector with respect to an injection chamber that is positionable on the test stand. It is possible to seal the fuel injectors, in each case accommodated in the injector test stand, in the radial direction in the injection chamber, or to bring about sealing in the axial direction.

For radial sealing in the nozzle area of the fuel injector, fixing the fuel injector in the upper area inside the injector test stand is generally sufficient, since in this case no axial force occurs. The fuel injector is fixed in the upper area by, for example, simply clamping the fuel injector to a test pressure line which acts with system pressure on the test piece which is chucked to the injector test stand. Other designs provide for clamping the fuel injector at its injector body with the aid of a slotted round socket or vise-like clamping jaws having a V-shaped cutout.

For axial sealing of the fuel injector, which generally occurs at the nozzle clamping nut of the fuel injector and which represents the same mounting position as the subsequent position in the motor vehicle, i.e., on the internal combustion engine, the necessary sealing force on the mounting in the axial direction must be applied in the opposite direction. The fuel injector is tensioned downwardly at its spanner flat, for example at the nozzle clamping nut, or the necessary counterforce is also applied at that location. For pushing the fuel injector down over the clamping surface in the axial direction, an injector-specific clamping claw is generally mounted in a holder, and the fuel injector is pushed down, against the axial seal, via the tightening of the clamping claw.

In many cases, an injection chamber which generally has a positionable design is used on injector test stands, and is pressed against the fuel injector by pneumatic means or via a tightening thread and held against the spanner flat. The mounting of the injection chamber which is displaceably held, i.e., variably positionable, on the injector test stand is generally achieved with the aid of different adapters or mounting plates which have an injector-specific design and are fastened to the injector test stand.

All of the proposed injector test stands in each case require injector-specific mounting plates, adapters, or clamping devices corresponding to the number of variants of the test pieces to be tested on an injector test stand, i.e., corresponding to the number of variants of the fuel injectors to be tested, which represents a highly unsatisfactory situation.

BRIEF SUMMARY OF THE INVENTION

According to the present invention, an injector test stand is proposed which on the one hand is characterized by a significant reduction in the individual parts required, and on the other hand ensures very simple handling. The injector test stand proposed according to the present invention includes a variable injector mounting which has a mounting plate that encloses an insert which is rotatable in the mounting plate. The rotatable insert of the variable injector mounting is designed in such a way that its lateral surface moves relative to the inner surface of a recess in the stationary mounting plate; i.e., a rotation of the rotatable insert inside the mounting plate of the variable injector mounting is possible without the two parts, which are movable relative to one another, being separated. Rotation of the rotatable insert relative to the stationarily held mounting plate is possible in the clockwise and counterclockwise directions.

As a result of the approach proposed according to the present invention, the large number of different injector-specific mounting plates or necessary adapters currently used, which must be kept on hand, depending on the number of fuel injectors to be tested, is replaced. Significant cost savings are thus achievable by using the variable injector mounting instead of different mounting devices solely for passenger vehicle fuel injectors. In addition, storage space may be saved, and much better oversight results from a substantial reduction in the necessary components. Due to the rotatable design, i.e., the positioning of the rotatable insert inside the recesses in the mounting plate, the fuel injector to be tested may be positioned at any angle in the clockwise direction or counterclockwise direction, which is extremely advantageous, in particular for the connection of rigid steel lines in which the test pressure is present. This is not achievable in the approaches used heretofore, having adjustable clamping jaws in which a rotary motion in the clockwise or counterclockwise direction is not possible.

Optionally, the stationary mounting plate and the rotatable insert of the variable injector mounting may be connected to one another via threads. For this purpose, the mounting plate is provided with a female thread, and the rotatable insert is provided with a corresponding male thread. The assembly is still rotatable, and, compared to the approaches used heretofore, allows the height of the clamping jaws to be adjusted. The coupling of the rotary motion to the height or vertical adjustment may be discontinued by accommodation of a threaded ring between the stationary mounting plate and the rotatable insert, so that the rotation and the height of the clamping jaws may be independently adjusted.

Clamping jaws are advantageously accommodated on an end face of the rotatable insert, which is held by the stationary mounting plate. It is possible to situate one relatively adjustable clamping jaw on the rotatable insert, or preferably, to situate both clamping jaws on the rotatable insert, in such a way that both clamping jaws are movable relative to the rotatable insert in the horizontal direction. The clamping jaws are preferably float-mounted on the rotatable insert, so that the fuel injector to be tested may be positioned in the middle of the respective recesses in the stationary mounting plate and the rotatable insert. If clamping jaws which are adjustable in a vise-like manner are situated opposite from one another, the position of the longitudinal axis of the fuel injector is a function of the diameter of the fuel injector. As a result, in conventional injector test stands, only a linear guiding of the injection chamber in the vertical direction would no longer be sufficient, so that an additional degree of freedom of motion for the injection chamber, which is generally vertically positionable, on the injector test stand would be necessary. This may be avoided by the approach, proposed according to the present invention, of a floating mounting of the clamping jaws on the rotatable insert.

The variable injector mounting is preferably designed in such a way that it includes the stationary mounting plate as well as the insert, which is rotatable relative to the mounting plate, accommodated therein. Both components, i.e., the stationary mounting plate and the rotatable insert, include a continuous U-shaped recess, at the open end of which the fuel injector is positionable in the variable injector mounting, i.e., is pushed into the variable-injector mounting through the open side. The float-mounted clamping jaws which are adjustable with respect to one another are situated at the top side of the rotatable insert. Due to the floating mounting, a width across flats, i.e., the distance of the clamping jaws which are configured in a vise-like manner, from one another, may be infinitely adjusted. The adjustment is preferably made using a fitted clamping screw via which the two clamping jaws are joined together and clampable relative to one another. The fuel injector to be tested may be variably positioned by rotating the rotatable insert in the clockwise direction or the counterclockwise direction, which in particular greatly simplifies connecting the fuel injector to a test pressure line, which may have a rigid design.

As a result of the approach proposed according to the present invention, the mounting plates having different widths and angles, via which the fuel injector to be tested would otherwise have to be positioned in such a way that a rigid test pressure line made of steel, for example, could be connected, are dispensed with.

BRIEF DESCRIPTION OF THE DRAWINGS

FIG. 3 shows an exploded illustration of a portion of the variable injector mounting according to FIG. 2.

FIG. 4 shows an illustration of the mounting plate and the rotatable insert as separate parts.

FIGS. 5.1 and 5.2 show different horizontal displacement options.

FIGS. 6.1 and 6.2 show a horizontal clamping.

FIGS. 7.1 and 7.2 show a horizontal rotation in the counterclockwise direction and in the clockwise direction.

FIGS. 8.1 through 8.3 show illustrations of the variable injector mounting from the bottom side, from the top side, and in cross section, respectively.

FIGS. 9 and 9.1 show a side view of the variable injector mounting and a sectional illustration, respectively.

FIGS. 11.1 and 11.2 show various vertical adjustment options.

FIGS. 13.1 and 13.2 show various vertical adjustment options of the specific embodiment according to FIG. 12.

DETAILED DESCRIPTION OF THE INVENTION

Figure 1:
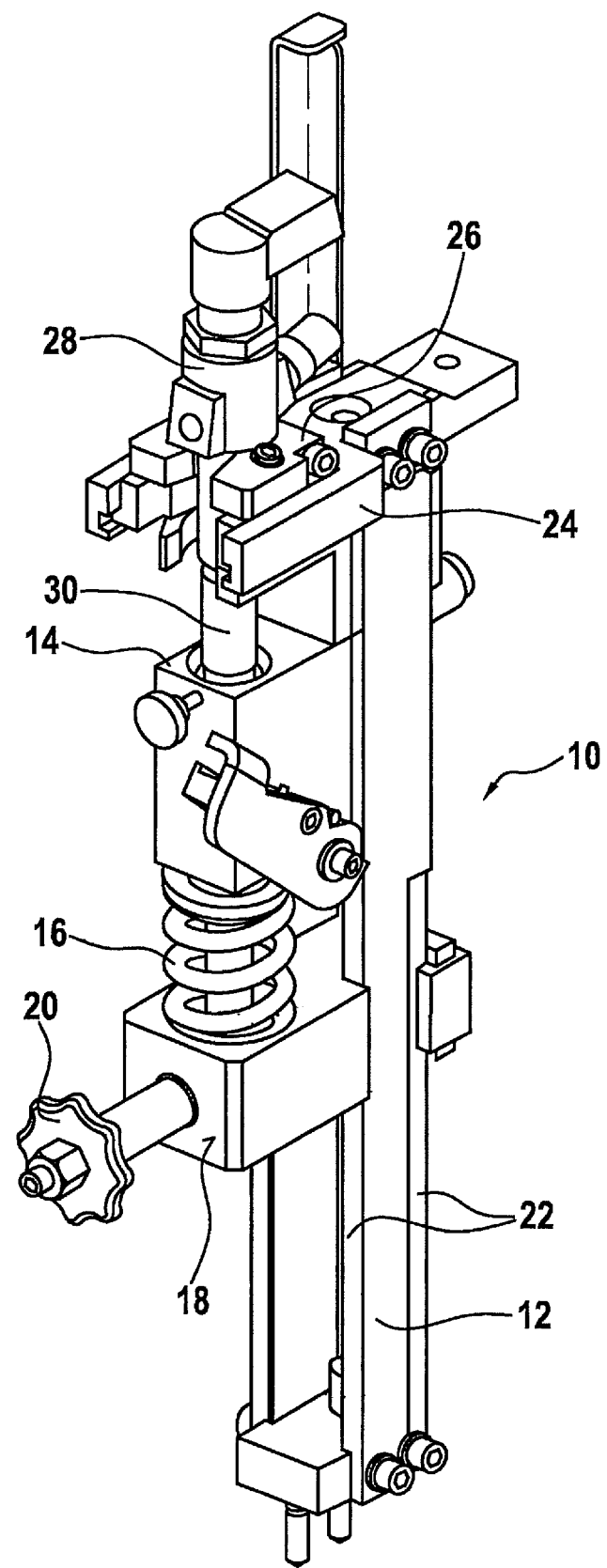
FIG. 1 shows a schematic view of an injector test stand.

The illustration according to FIG. 1 shows an injector test stand.

The illustration according to FIG. 1 shows an injector test stand 10 having a mounting device 12 on which an injection chamber 14 which is variably positionable in the vertical direction is held. It is apparent from the illustration according to FIG. 1 that variably positionable injection chamber 14 includes a preloading spring 16 which is situated between injection chamber 14 and a fixing device 18. Via fixing device 18, variably positionable injection chamber 14 may be variably positioned, viewed in the vertical direction, relative to the chucking position of fuel injector 28 to be tested, with the aid of a tommy screw 20. Fixing device 18 is guided on guide profiles 22 which extend in the vertical direction along mounting device 12 of injector test stand 10. Depending on the setting of fixing device 18 and the action of preloading spring 16, a seal may be set in the axial direction, between injection chamber 14 and the injection nozzle of fuel injector 28 to be tested. It is also apparent from the illustration according to FIG. 1 that injector test stand 10 illustrated therein includes a holder 24. Variable injector mounting 26, in which fuel injector 28 to be tested is chucked in the illustration according to FIG. 1, is present in holder 24.

Figure 2:
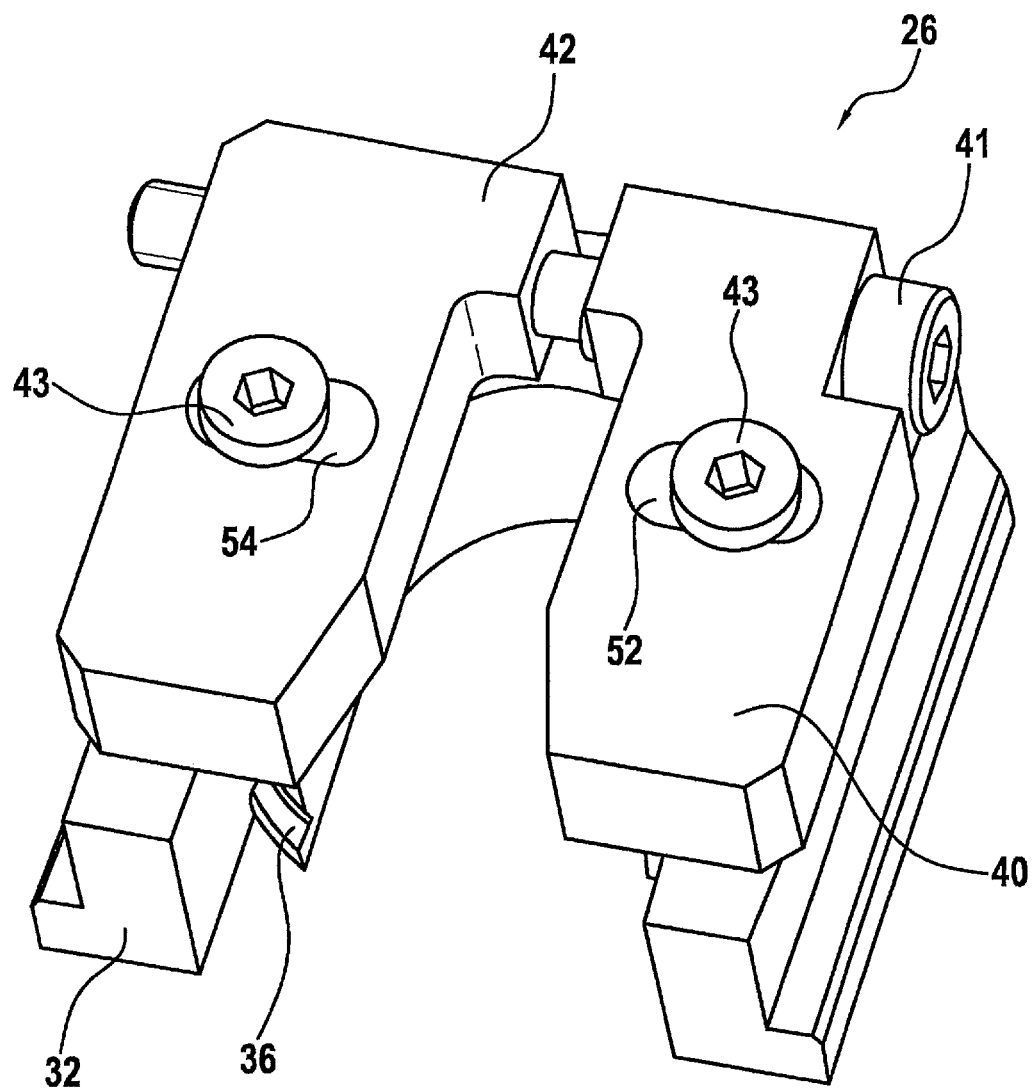
FIG. 2 shows a variable injector mounting.

FIG. 2 shows a perspective depiction of the variable injector mounting as used on the injector test stand according to FIG. 1.

It is apparent from the perspective illustration according to FIG. 2 that variable injector mounting 26 includes a stationary mounting plate 32 which encloses a rotatable insert 36. Stationary mounting plate 32 and rotatable insert 36 accommodated therein each include a recess, as is apparent from the illustration according to FIG. 4. The illustration according to FIG. 2 shows that a first clamping jaw 42 and a second clamping jaw 40 are present at the top side of rotatable insert 36. The two clamping jaws 40, 42 are situated opposite one another in a vise-like manner. Each of clamping jaws 40 and 42 is connected to rotatable insert 36, only partially illustrated in FIG. 2, via a guide screw 43 or some other suitable fastening means. First clamping jaw 40 and second clamping jaw 42 include openings 52, 54, respectively, in the shape of oblong holes, through which guide screws 43 extend in each case. The illustration according to FIG. 2 shows that the two clamping jaws 40, 42 are clampable with respect to one another by a clamping screw 41 which extends through both clamping jaws 40, 42. Optionally, a snap ring or a washer disk may be accommodated between the two clamping jaws 40, 42 in the pass-through area of clamping screw 41 (see the exploded illustration according to FIG. 3).

FIG. 2 shows that the two guide screws have a tool fitting which may be designed, for example, as a hexagon socket or the like. In addition, it is also possible to provide automation, Torx fittings, or the like.

Depending on the horizontal extension in oblong hole-shaped openings 52, 54 in the two clamping jaws 40 or 42, a horizontal displacement path of the clamping jaws results with respect to rotatable insert 36 which is enclosed by stationary mounting plate 32.

FIG. 3 shows an exploded illustration of the clamping jaws, the guide screws, and the clamping screw.

FIG. 3 shows that guide screws 43, via which clamping jaws 40, 42 are fixed to and in particular positioned on rotatable insert 36, have a thread only in the lower section, which engages with corresponding thread 42 on rotatable insert 36. In the upper area, guide screws 43 have a shank-shaped design, so that guiding with close tolerance is ensured between guide screws 43 and side walls in clamping jaws 40, 42 which adjoin oblong hole-shaped openings 52, 54. FIG. 3 also shows the length of clamping screw 41 which extends through an appropriately configured opening or thread of clamping jaws 40, 42. It is also particularly apparent from the exploded illustration according to FIG. 3 that washer disk 44, or a snap ring, or the like is present between clamping jaws 40 and 42.

FIG. 4 shows an exploded illustration of the components mounting plate and rotatable insert of the variable injector mounting, which are separate from one another in the illustration.

As is apparent from the illustration according to FIG. 4, stationary mounting plate 32 has a recess 34, as does rotatable insert 36 (see reference numeral 38). The two recesses 34, 38 are aligned with one another and are essentially U-shaped, the open sides of recess 34, 38 being situated one above the other so that fuel injector 28 may be pushed through this open side in variable injector mounting 26 which is fastened to holder 24 of injector test stand 10. As shown in the illustration according to FIG. 4, a lateral surface 46 of rotatable insert 36 and an inner surface 50 of stationary mounting plate 32 contact one another. Rotatable insert 36 is pushed into recess 34 in stationary mounting plate 32 until contact is made with a circumferential or partially circumferential collar 48, and the rotatable insert may rotate relative to the stationary mounting plate. It is apparent from the illustration according to FIG. 4 that oppositely situated threads 72 are formed in the legs of rotatable insert 36 which adjoin recess 38, and guide screws 43 are screwed into the threads (see the illustrations according to FIGS. 2 and 3).

FIGS. 5.1 and 5.2 show horizontal displacements of the clamping jaws of variable injector mounting 26.

It is apparent from the illustration according to FIG. 5.1 that for achieving a first horizontal displacement 56, first clamping jaw 40 is moved the maximum distance to the left after guide screw 43 in first oblong hole-shaped opening 52 is loosened, so that first clamping jaw 40 is set with respect to second clamping jaw 42, which is in its original position. In contrast, the illustration according to FIG. 5.2 shows that the exact opposite procedure is carried out. To achieve a second horizontal displacement 58, first clamping jaw 40 is in its original position, i.e., its maximum position with respect to recesses 34, 38, whereas second clamping jaw 42, after guide screw 43 is loosened and displaced relative to rotatable insert 36, is moved to the right by its maximum travel distance, resulting in a second horizontal displacement 58 in the opposite direction from first horizontal displacement 56 according to FIG. 1.

In both cases illustrated in FIGS. 5.1 and 5.2, it is now possible to pretension the two clamping jaws 40 and 42 against one another after tightening clamping screw 41.

The illustration according to FIGS. 6.1 and 6.2 shows clamping of the clamping jaws relative to one another.

FIG. 6.1 depicts clamping jaws 40 and 42 of variable injector mounting 26 in an open position 62. In open position 62 according to FIG. 6.1, the two clamping jaws 40 and 42 are set back at a maximum distance from one another, so that in open position 62 a maximum distance results between the inner sides of mutually facing clamping jaws 40 and 42. FIG. 6.2 shows bracing 60 and a resulting clamped position 64 in which the inner sides of clamping jaws 40 and 42 have the maximum possible bracing against one another. When clamping screw 41 which passes through the two clamping jaws 40 and 42 is tightened, the clamping jaws, guided by the two guide screws 43 in oblong hole-shaped recesses 42, 44, move toward one another until fuel injector 28 illustrated in FIGS. 6.1 and 6.2 is uniformly clamped and centrically positioned in recesses 34 and 38 in mounting plate 32 and rotatable insert 36, respectively.

It is apparent from FIGS. 7.1 and 7.2 that the two clamping jaws 40 and 42, which are held on rotatable insert 36 via guide screws 43, undergo a counterclockwise horizontal rotation 66 in a first direction of rotation 68. For this purpose, rotatable insert 36 is rotated counterclockwise in stationary mounting plate 32 in first direction of rotation 68. As a result of this embodiment variant, an easy connection between fuel injector 28, which is clamped by mounting plates 40 and 42, and a pressure line made of steel, for example, which conducts the test pressure, may be advantageously ensured.

In contrast, FIG. 7.2 shows that clamping jaws 40, 42, which are fixed to rotatable insert 36 via guide screws 43, have undergone a horizontal rotation 66 in the clockwise direction, i.e., in second direction of rotation 70.

The rotation options of rotatable insert 36 of variable injector mounting 26 on the one hand simplify the handling of injector test stand 10 having a variable injector mounting 26, and allow rapid assembly and disassembly, as well as adjustments which are to be made when fuel injector 28 to be tested is connected to injector test stand 10.

FIGS. 8.1, 8.2, and 8.3 show the variable injector mounting in a bottom view, in a top view, and in a sectional illustration, respectively.

FIG. 8.1 shows variable injector mounting 26 from the bottom side. Rotatable insert 36 is guided without play in stationary mounting plate 32. Due to the absence of play, precise rotation, even by a few angular degrees between rotatable insert 36 and mounting plate 32, is possible. It is apparent from the view according to FIG. 8.1 that threads 72 in the legs of rotatable insert 36 are situated essentially opposite from one another. Portions of clamping jaws 40 and 42 together with oblong hole-shaped openings 52, 54 formed therein are likewise still apparent in the bottom view according to FIG. 8.1.

The top view according to FIG. 8.2 shows that in this state, clamping jaws 40 and 42 are pushed together to the maximum extent above recess 34 in stationary mounting plate 32, resulting in a minimum distance between inner sides of clamping jaws 40 and 42. The positioning of clamping jaws 40 and 42 illustrated in FIG. 8.2 allows fixing of fuel injectors 28 having a small diameter.

Clamping screw 41 is tightened to the maximum extent, resulting in the minimum distance between the inner side of clamping jaws 40 and 42.

The illustrations according to FIGS. 9 and 9.1 show a side view of the variable injector mounting.

FIG. 9 shows that variable injector mounting 26 has a relatively flat design. Clamping jaws 40 and 42, which are illustrated in the side view and are positioned on rotatable insert 36 at a relative distance from one another via guide screws 43, are situated at the top side of stationary mounting plate 32 of variable injector mounting 26. Clamping jaws 40 and 42 are set against one another via clamping screw 41, and fix a fuel injector 28, chucked between the clamping jaws, at its lateral surface. The sectional illustration according to FIG. 9.1 shows that stationary mounting plate 32 of variable injector mounting 26 encloses rotatable insert 36 in a U shape. Recess 38, which is delimited by the open legs of rotatable insert 36, and recess 34 in stationary mounting plate 32 are aligned with one another, so that fuel injector 28 to be tested may be pushed through the open side of the two recesses 34, 38 in variable injector mounting 26.

Figure 10:
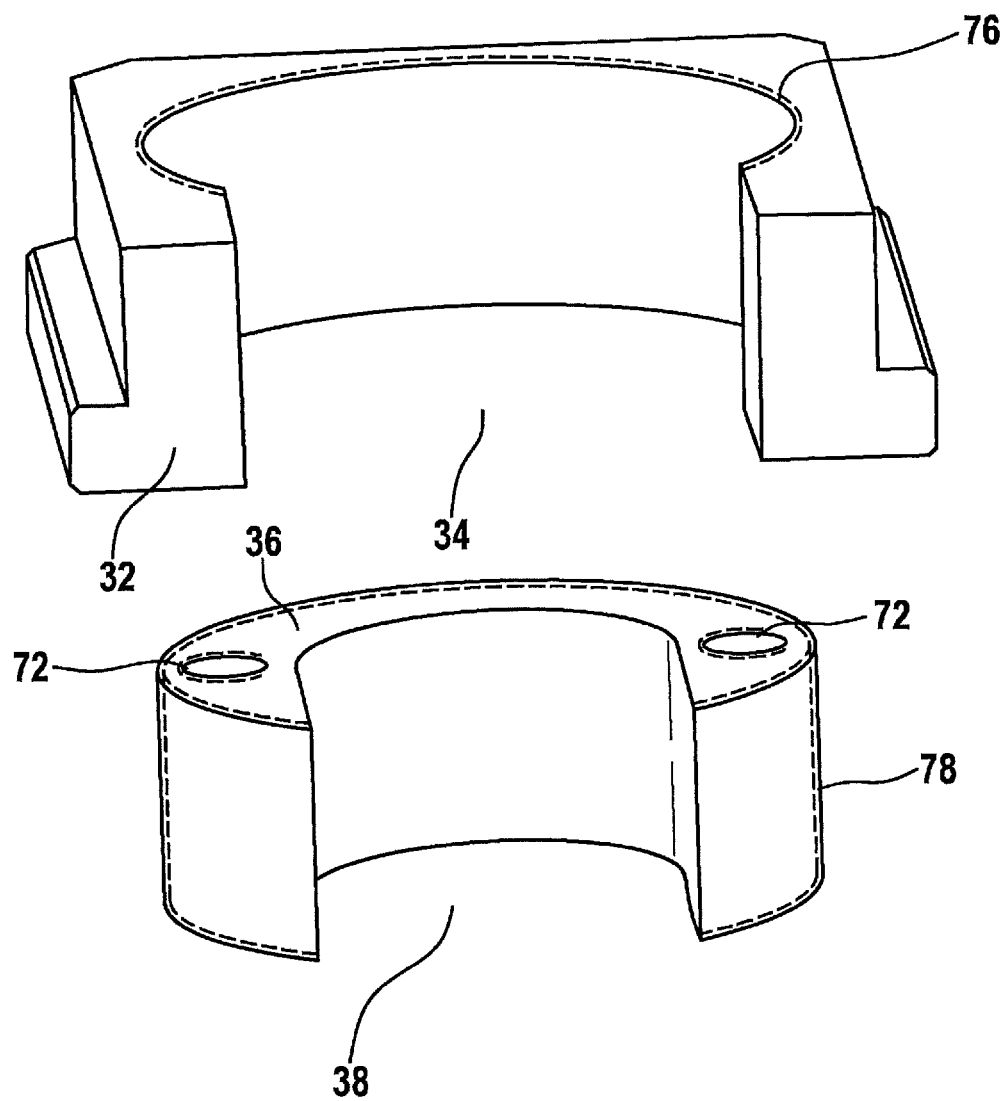
FIG. 10 shows an illustration of another specific embodiment of the mounting plate and the rotatable insert.

The illustration in FIG. 10 shows another specific embodiment of stationary mounting plate 32 and of rotatable insert 36.

FIG. 10 illustrates a stationary mounting plate 32 having recess 34. The inner surface of stationary mounting plate 32 is provided with a female thread 76 which accommodates a rotatable insert 36 which is provided with a male thread 78. Rotatable insert 36 has a recess 38, and may be completely or partially screwed into mounting plate 32. The height of the variable injector mounting may be adjusted by only partially screwing in the rotatable insert. This allows the vertical position of a chucked fuel injector 28 to be adjusted independently of the adjustment options of injection chamber 14. The vertical displacement per revolution corresponds to the pitch of the thread. This may be set by the selection of the type of thread, for example a coarse thread or a fine thread. Rotatable insert 36 has threads 72 at oppositely situated legs of insert 36, into which guide screws 43 for clamping jaws 41, 42 are screwed.

FIGS. 11.1 and 11.2 illustrate vertical displacements of rotatable insert 36 of variable injector mounting 26.

FIG. 11.1 illustrates a rotatable insert 36 which is only partially screwed into stationary mounting plate 32. A completely screwed-in rotatable insert 36 is illustrated in FIG. 11.2. In the two illustrations, variable injector mounting 26 has different vertical positions, whose path difference is determined by the number of revolutions of rotatable insert 36 and the pitch of threads 76, 78. Holding jaws 40 and 42 are float-mounted on rotatable insert 36 via guide screws 43, and have horizontal adjustment options as illustrated in FIGS. 5 and 6. A horizontal rotation of rotatable insert 36, as illustrated in FIGS. 7.1 and 7.2, is likewise possible, the horizontal rotation and the vertical displacement being associated with one another via threads 76 and 38. For a predefined horizontal rotation, the vertical displacement may be adjusted in steps of a complete revolution of rotatable insert 36 in each case.

Figure 12:
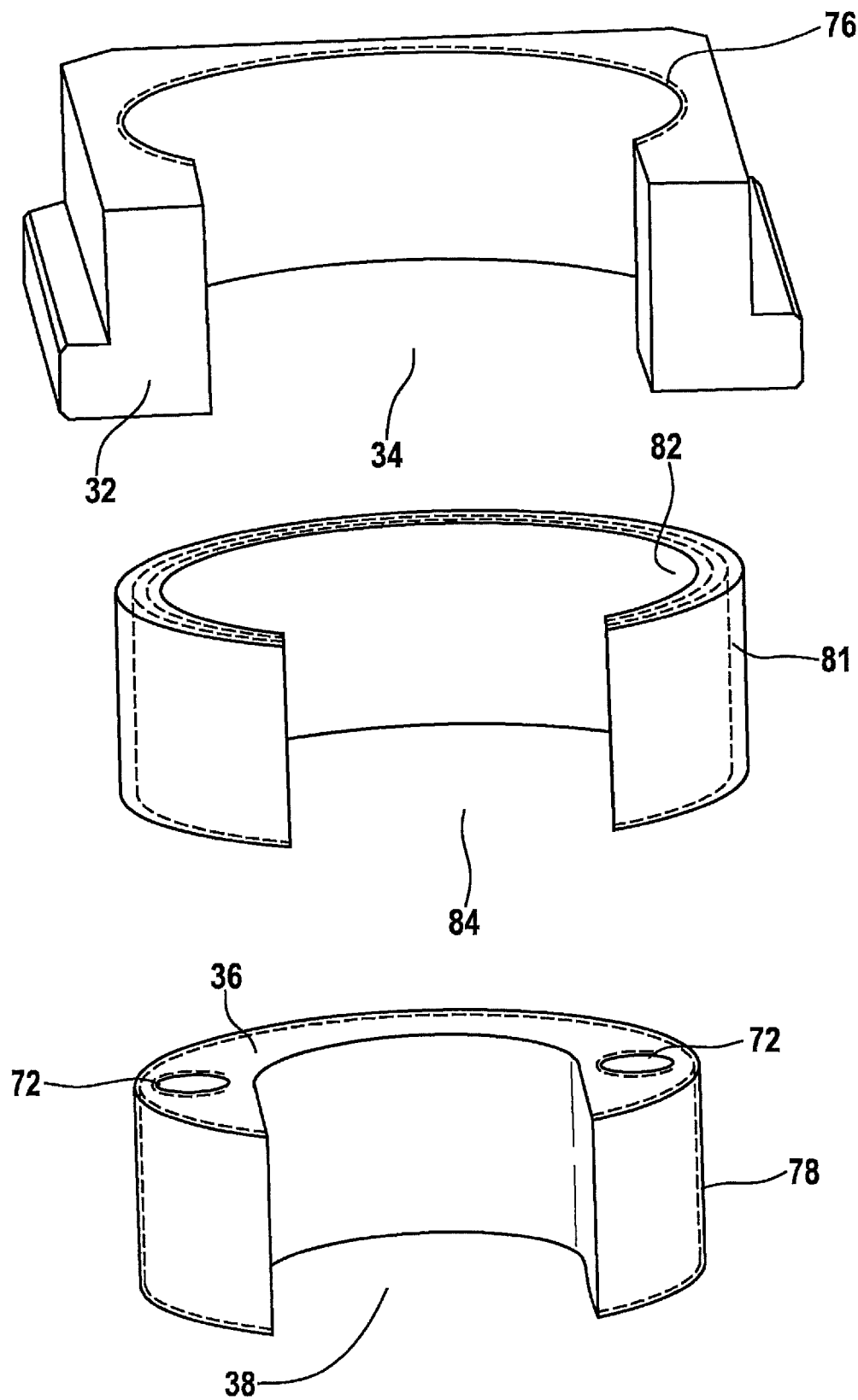
FIG. 12 shows another specific embodiment of the mounting plate and the rotatable insert, in which a threaded ring is additionally accommodated.

The illustration in FIG. 12 shows another specific embodiment of variable injector mounting 26, in which a threaded ring 80 is accommodated between stationary mounting plate 32 and rotatable insert 36.

FIG. 12 illustrates stationary mounting plate 32 having a female thread 76. A threaded ring 80 which is provided with a male thread 81 is accommodated in stationary mounting plate 32. Threaded ring 80 also has a female thread 82 which accommodates rotatable insert 36, which is provided with a male thread 78. Rotatable insert 36, mounting plate 32, and threaded ring 80 have recesses 35, 38, 84, respectively. Threaded ring 80 may be completely or partially screwed into stationary mounting plate 32. Likewise, rotatable insert 36 may be completely or partially screwed into threaded ring 80. The height of variable injector mounting 26 may be adjusted by partially screwing in threaded ring 80 or rotatable insert 36. This allows the vertical position of a chucked fuel injector 28 to be adjusted, independently of the adjustment options of injection chamber 14. The vertical position, i.e., height, as well as the horizontal rotation of rotatable insert 36 may be infinitely adjusted using accommodated threaded ring 80. The vertical displacement per revolution corresponds to the pitch of the thread. This may be set by the selection of the type of thread, for example a coarse thread or a fine thread. It is possible to select a different thread pitch for the screw connection between stationary mounting plate 32 and threaded ring 80 than for the screw connection between threaded ring 80 and rotatable insert 36. Likewise, it is possible to provide only a male thread or a female thread on threaded ring 80, and to support the respective other side in a sliding manner. Rotatable insert 36 has threads 72 at oppositely situated legs of insert 36, into which guide screws 43 for clamping jaws 41, 42 are screwed.

FIGS. 13.1 and 13.2 illustrate vertical displacements of rotatable insert 36 of variable injector mounting 26.

FIG. 13.1 illustrates a threaded ring 80 which is only partially screwed into stationary mounting plate 32, and a rotatable insert 36 which is only partially screwed into threaded ring 80. FIG. 13.2 illustrates the variable injector mounting in the lowest possible vertical position. Rotatable insert 36 is completely screwed into threaded ring 80, which is in turn completely screwed into stationary mounting plate 32. In both FIGS. 13.1 and 13.2, variable injector mounting 26 has different vertical positions, whose path difference is determined by the number of revolutions of rotatable insert 36 or of threaded ring 80, and the pitch of threads 76, 78, 81, and 82. Holding jaws 40 and 42 are float-mounted on rotatable insert 36 via guide screws 43, and have horizontal adjustment options as illustrated in FIGS. 5 and 6. A horizontal rotation of rotatable insert 36, as illustrated in FIGS. 7.1 and 7.2, is likewise possible. Due to threaded ring 80, the horizontal rotation is separated from the vertical displacement, so that the horizontal rotation and the vertical position may be infinitely adjusted independently of one another.

Significant cost savings may be achieved by the approach proposed according to the present invention, in particular by the use of variable injector mounting 26. The large number of different injector-specific mounting plates and adapters required heretofore may be dispensed with without replacement, and the storage of same may be dispensed with as well. Much better oversight results from the significant reduction in the components to be used on an injector test stand 10. The possibility of a horizontal rotation 66 by rotation of rotatable insert 36 relative to stationary mounting plate 32 of variable injector mounting 26 allows the fuel injector to be positioned at practically any angle. This is particularly advantageous for the connection of rigid test pressure lines. In particular, fuel injector 28 may be centrically positioned due to the floating mounting of holding jaws 40 and 42. The floating mounting allows alignment of the fuel injector with respect to the injection chamber, which is generally vertically positionable, without requiring lateral displacement of the injection chamber, so that only linear guiding of the injection chamber is sufficient, since bearing tolerances between fuel injector 28 to be tested and injection chamber 14, which is positionable only in the vertical direction, may be compensated for due to the floating mounting of clamping jaws 40 and 42. The vertical adjustment of variable injector mounting 26 in addition to the vertical positioning of injection chamber 14 by using threads on stationary mounting plate 32, rotatable insert 36, or on an additional threaded ring 80 simplifies the precise adjustment of the vertical distance between fuel injector 28 and injection chamber 14, and may completely replace adjustment options on injection chamber 14 when only small adjustment paths are necessary.

What is claimed is:

1. An injector test stand for a fuel injector, comprising:
a holder for fixing the fuel injector;
an injection chamber configured to be positioned relative to the fuel injector; and
a variable injector mounting accommodated in the holder,
wherein the variable injector mounting includes a rotatable insert and a mounting plate,
wherein the mounting plate has a first continuous recess, and
wherein the rotatable insert has at least one adjustable clamping jaw and a second continuous recess which is concentric with the first continuous recess.

2. The injector test stand as recited in claim 1,
wherein the rotatable insert has a lateral surface and the mounting plate has an inner surface, and
wherein the lateral surface of the rotatable insert is in contact with the inner surface of the mounting plate.

3. The injector test stand as recited in claim 2, wherein:
the rotatable insert has a male thread;
the mounting plate has a female thread;
and the rotatable insert is accommodated in a height-adjustable manner via the female thread.

4. The injector test stand as recited in claim 2, wherein:
a threaded ring is accommodated between the rotatable insert and the mounting plate;
the threaded ring has at least one of a female thread and a male thread; and
the mounting plate and the rotatable insert have one of (i) a corresponding mating thread or (ii) a sliding surface on a side facing the threaded ring.

5. The injector test stand as recited in claim 1, wherein a first clamping jaw and a second clamping jaw are accommodated in a horizontally movable manner on the rotatable insert.

6. The injector test stand as recited in claim 5, wherein at least one of the clamping jaws is pretensioned against the other clamping jaw with the aid of a clamping screw.

7. The injector test stand as recited in claim 5, wherein the clamping jaws each have openings for guide screws, and wherein the guide screws hold the clamping jaws on the rotatable insert.

8. The injector test stand as recited in claim 7, wherein the guide screws each have a tool fitting, and the openings in the clamping jaws have the shape of oblong holes.

9. The injector test stand as recited in claim 5, wherein the clamping jaws are float-mounted on the rotatable insert.

10. The injector test stand as recited in claim 1, wherein the rotatable insert is configured to undergo a horizontal rotation in at least one of a first direction of rotation and a second direction of rotation, relative to the mounting plate.

11. The injector test stand as recited in claim 1, wherein the rotatable insert has a collar which abuts one side of the mounting plate.

* * * * *